United States Patent
Lin et al.

(10) Patent No.: US 8,380,520 B2
(45) Date of Patent: Feb. 19, 2013

(54) FOOD PROCESSOR WITH RECOGNITION ABILITY OF EMOTION-RELATED INFORMATION AND EMOTIONAL SIGNALS

(75) Inventors: Ying-Tzu Lin, Hsinchu (TW); Chao-Ming Yu, Kaohsiung (TW); Hao-Hsiang Yu, Taichung (TW); Tsang-Gang Lin, Pingtung County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 400 days.

(21) Appl. No.: 12/758,226

(22) Filed: Apr. 12, 2010

(65) Prior Publication Data

US 2011/0029314 A1    Feb. 3, 2011

Related U.S. Application Data

(63) Continuation-in-part of application No. 12/512,679, filed on Jul. 30, 2009.

(30) Foreign Application Priority Data

Dec. 22, 2009    (TW) ............................... 98144209 A

(51) Int. Cl.
    *G10L 15/22*    (2006.01)
    *G10L 21/00*    (2006.01)
(52) U.S. Cl. ...................... 704/275; 704/270
(58) Field of Classification Search .......... None
    See application file for complete search history.

(56) References Cited

U.S. PATENT DOCUMENTS

| | | | |
|---|---|---|---|
| 6,249,710 B1 * | 6/2001 | Drucker et al. | 700/15 |
| 6,408,272 B1 * | 6/2002 | White et al. | 704/270.1 |
| 6,842,510 B2 * | 1/2005 | Sakamoto | 379/102.01 |
| 7,184,960 B2 * | 2/2007 | Deisher et al. | 704/275 |
| 7,808,368 B2 * | 10/2010 | Ebrom et al. | 340/286.11 |
| 8,078,472 B2 * | 12/2011 | Resch et al. | 704/275 |
| 2006/0129408 A1 | 6/2006 | Shen et al. | |

FOREIGN PATENT DOCUMENTS

| | | |
|---|---|---|
| CN | 1389852 A | 1/2003 |
| CN | 1677487 A | 10/2005 |
| CN | 1828682 A | 9/2006 |
| CN | 102222164 A | 10/2011 |
| JP | 64-085760 | 3/1989 |
| JP | 04-189141 | 7/1992 |
| JP | 2003108183 A | 4/2003 |
| JP | 2003210112 A | 7/2003 |
| JP | 2003294235 A | 10/2003 |
| JP | 2005254495 A | 9/2005 |
| JP | 2005261286 A | 9/2005 |

(Continued)

OTHER PUBLICATIONS

Japan Paten Office, "Office Action", Jan. 10, 2012, Japan.

(Continued)

*Primary Examiner* — Talivaldis Ivars Smits
(74) *Attorney, Agent, or Firm* — Morris Manning & Martin LLP; Tim Tingkang Xia, Esq.

(57) ABSTRACT

A food processor with recognition ability of emotion-related information and emotional signals is disclosed, which comprises: an emotion recognition module and a food processing module. The emotion recognition module is capable of receiving sound signals so as to identify an emotion containing in the received sound signals. The food processing module is capable of producing food products with a taste corresponding to the emotion recognition result of the emotion recognition module.

26 Claims, 4 Drawing Sheets

FOREIGN PATENT DOCUMENTS

| | | | |
|---|---|---|---|
| JP | 2008228722 A | 10/2008 |
| KR | 20040038419 A | 5/2004 |
| KR | 20080086791 A | 9/2008 |
| KR | 20100001928 A | 1/2010 |
| TW | 219993 | | 2/1994 |
| TW | 508564 B | 11/2002 |
| TW | 517221 B | 1/2003 |
| TW | 574684 B | 2/2004 |
| TW | 200620242 | | 6/2006 |
| TW | I269192 B | 12/2006 |
| TW | 200837716 A | 9/2008 |

OTHER PUBLICATIONS

Raul Fernandez, A Computational Model for the Automatic Recognition of Affect in Speech, Doctor of Philosophy, Feb. 2004, P1-284, Massachusetts Institute of Technology.

Intellectual Property Office, Ministry of Economic Affairs, R.O.C., "Office Action", Apr. 10, 2012, Taiwan.

State Intellectual Property Office of the People's Republic of China, "Office Action", Aug. 22, 2012, China.

* cited by examiner

FOOD PROCESSOR WITH RECOGNITION ABILITY OF EMOTION-RELATED INFORMATION AND EMOTIONAL SIGNALS

CROSS-REFERENCE TO RELATED APPLICATIONS

This non-provisional application claims priority under 35 U.S.C. §119(a) on Patent Application No(s). 098142209 filed in Taiwan, R.O.C. on Dec. 12, 2009, the entire contents of which are hereby incorporated by reference.

This application is a continuation-in-part patent application of U.S. application Ser. No. 12/512,679 filed on Jul. 30, 2009, the entire contents of which are hereby incorporated by reference for which priority is claimed under 35 U.S.C. §120.

TECHNICAL FIELD

The present disclosure relates to a food processor with recognition ability of emotion-related information and emotional signals, and more particularly, to a food processor capable of identifying emotions containing in a sound signal issued from a user and thus producing food products with tastes corresponding to the identified emotions.

TECHNICAL BACKGROUND

In recent years, there are more and more speech/phonetic recognition systems being widely applied in various technical fields, such as telephone voice system, voice input device or media interactive device, and so on.

One of which is a multi-language speech recognition method and system disclosed in TW. Pat. Publ. No. 574684. The aforesaid speech recognition method includes the steps of: receiving information reflecting the speech, determining at least one broad-class of the received information, classifying the received information based on the determined broad-class, selecting a model based on the classification of the received information, and recognizing the speech using the selected model and the received information. Thereby, the disadvantages of the match-trained Hidden Markov Model (HMM), i.e. the parameters of the match-trained HMM are tuned to its match channel environment and the match-trained HMM may recognize speech in its match channel environment more accurately than a mix-trained HMM. However, the match-trained HMM may not recognize speech in a non-matching channel environment as well as the mix-trained HMM, can be improved.

One another such speech/phonetic recognition system is an independent real-time speech recognition system disclosed in TW. Pat. Publ. No. 219993. In the aforesaid system, a speech signal is first being converted into an analog speech signal that is then being fed to an amplifier for amplification, and then the amplified analog speech signal is converted into a serial digital signal and further into a parallel digital signal by the use of a analog-to-digital converter. Thereafter, a digital processor is used for performing a preprocessing operation, a feature extracting operation and a voice activity detection so as to obtain a multi-level fixed-point linear predictive coefficient, that is stored in a training process to be used as referencing sample, and is measured by a symmetry-rectified dynamic programming matching algorithm and compared with referencing samples for obtaining a speech recognition result.

Moreover, there is an emotion-based phonetic recognition system disclosed in TW. Pat. Publ. No. I269192, which includes a classification algorithm and an emotion classification module established basing upon a field-independent emotion database containing emotions responding to specific phonetic notations. The aforesaid emotion classification module is embedded with an automatic rule generator capable of performing a data-mining centering on phonetic notations that is able to map a speech into a vector space according to the emotion-inducing elements concluded from emotion psychology and thereby performs a training process for classifying the emotion of the speech. Accordingly, the aforesaid emotion-based phonetic recognition system is able to effective improve the emotion communication ability of a human-machine interface as one of the interesting challenges in the community of human-computer interaction today is how to make computers be more human-like for intelligent user interfaces.

Furthermore, there is a method and system for phonetic recognition disclosed in TW. Pat. Publ. No. 508564. In the method and system for phonetic recognition, the phonetic sound can be analyzed in timbre characteristic for allowing the user's timbre to be recognized, while variation in volume of the phonetic sound can be analyzed so as to tell the user's emotional condition.

In addition to the aforesaid patents, there are many U.S. patents relating to emotion and phonetic recognition that are able to recognize a human emotion through the detection of pulse, heart beat or respiration rate, etc., and are applicable to lie detectors.

However, among those related patents or those consumer products currently available on the market, there is no food processor that is designed with phonetic/speech recognition function for facilitating a use to interact with the food processor through voice communication and thus directing the operation of the food processor.

TECHNICAL SUMMARY

The object of the present disclosure is to provide a food processor with recognition ability of emotion-related information and emotional signals capable of identifying emotions containing in a sound signal issued from a user and thus producing food products with tastes corresponding to the identified emotions.

To achieve the above object, the present disclosure provides a food processor with recognition ability of emotion-related information and emotional signals, comprises: an emotion recognition module, capable of receiving sound signals so as to identify an emotion containing in the received sound signals; and a food processing module, capable of producing food products with a taste corresponding to the emotion recognition result of the emotion recognition module.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
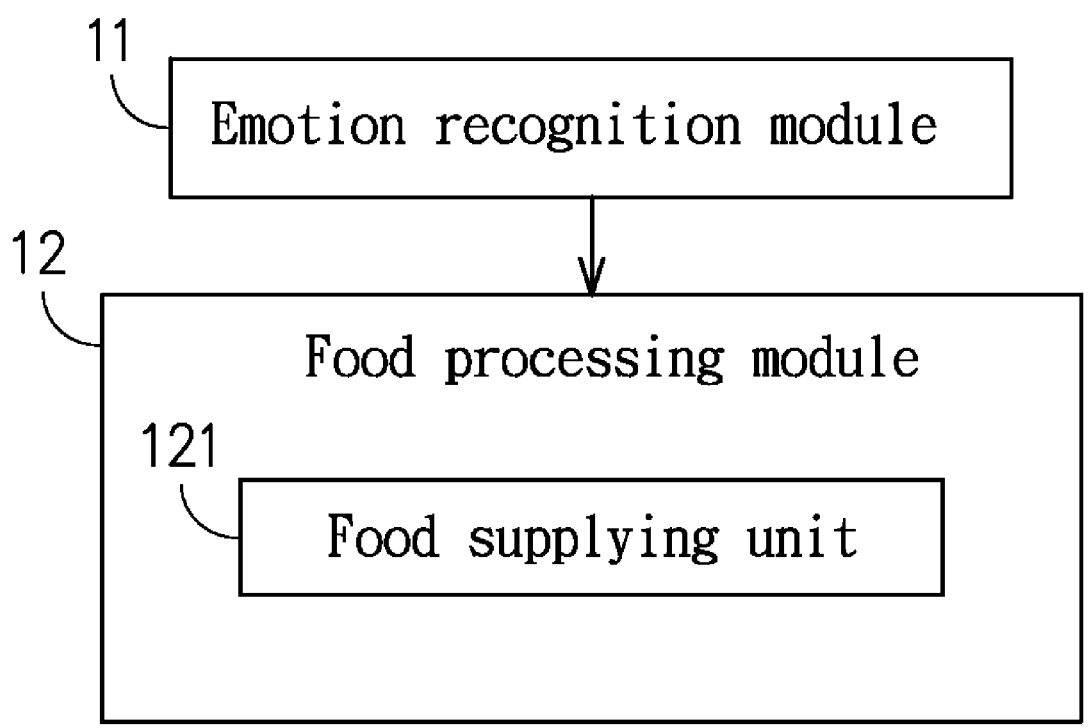
FIG. 1 is a block diagram depicting a food processor according to a first embodiment of the present disclosure.

Please refer to FIG. 1, which is a block diagram depicting a food processor according to a first embodiment of the present disclosure. In FIG. 1, the food processor 10 with recognition ability of emotion-related information and emotional signals comprises: an emotion recognition module 11 and a food processing module 12, in which the food processing module further comprises a food supplying unit 121 for supplying at least one food product, such as chocolates, candies, cakes, cookies, or drinks etc. The emotion recognition module 11 is designed to recognize emotions containing in the received sound signals. That is, the emotion recognition module 11 is able to detect emotions through the evaluation of volume, frequency of the sound and tone or through the detection of user's pulse, heart rate, respiration rate, etc. According to the detection of the emotion recognition module 11, the food processing module 12 can be directed to produce food products with a taste corresponding to the current emotion of the user, such as sweet, sour, bitter, spicy, cool or the combination thereof.

In an example for producing chocolate products, when a user is reading out a sentence like: "我愛你", "我想你" "I love you", or ""L-O-V-E", in English, Chinese or any other languages as a sentence or word by word, to the food processor 10 in a happy and sentimental mood, his/her tone should be soft and affective so that the happy emotion is detected by the emotion recognition module 11 and thus the emotion recognition module 11 will direct the food supplying unit 121 to provide a sweet chocolate to the food processor 10 for outputting. However, if the user is reading out another sentence like: "我想你", "我討厭你", "I hate you" or H-A-T-E", in English, Chinese or any other languages as a sentence or word by word, detestfully to the food processor 10, his/her tone should be rigid and relentless so that the gloomy emotion is detected by the emotion recognition module 11, and thus the emotion recognition module 11 will direct the food supplying unit 121 to provide a bitter or tasteless chocolate to the food processor 10 for outputting. Thus, different users are able to read out different words or sentences in different emotions so as to obtain food products with different taste corresponding to their current moods. It is noted that the food product of the food processor 10 is not limited to be chocolate, which can include cookies, candies, cakes and drinks, and the like.

Figure 2:
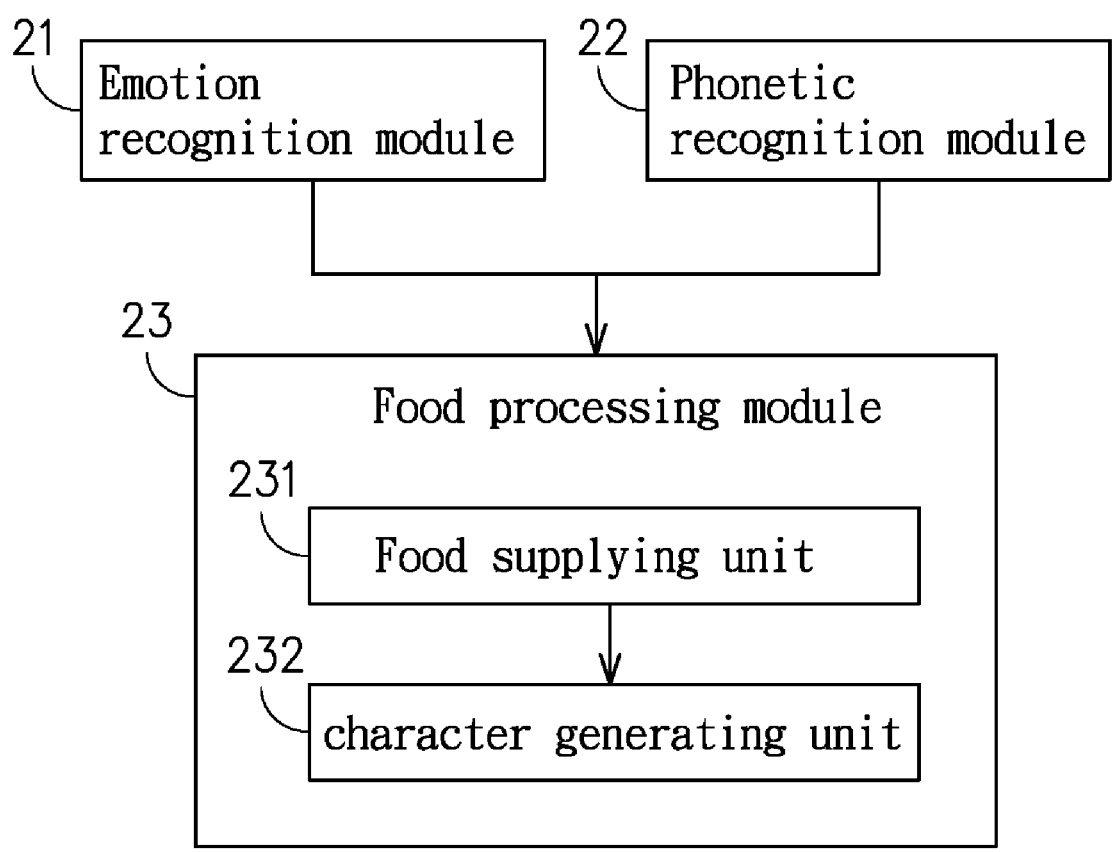
FIG. 2 is a block diagram depicting a food processor according to a second embodiment of the present disclosure.

Please refer to FIG. 2, which is a block diagram depicting a food processor according to a second embodiment of the present disclosure. In FIG. 2, the food processor 20 comprises: an emotion recognition module 21, a phonetic recognition module 22 and a food processing module 23, in which the food processing module 23 further comprises a food supplying unit 231 and a character generating unit 232. It is noted that both the emotion recognition module 21 and the food processing module 23 are designed to function similar to those described in the first embodiment and thus are not described further herein. The present embodiment is characterized in its phonetic recognition module 22 as it is designed for receiving sound signals so as to identify a content of characters, phrases, and sentences, containing in the received sound signals as the recognized content includes characters and the total number of the characters as well as phrases and the whole sentences consist of the recognized characters, and moreover, the food processing module 23 is further being comprised of the food supplying unit 231 and the character generating unit 232, in which the food supplying unit 231 is used for supplying at least one food product; and the character generating unit 232 is used for forming at least one character on the food products from the food supplying unit 231 and is capable of generating characters of various character forms. Moreover, in an embodiment of the present disclosure, the character generating unit 232 can be an embossing device such as character mold, that is capable of impressing on the food product's surface for forming characters lowered into or raised out of the surface of the food product while enabling the formed character to have different heights. In another embodiment of the present disclosure, the character generating unit 232 can be an engraving device, such as cutting tools, that is capable of forming the characters on the food product's surface by carving. Furthermore, in yet another embodiment of the present disclosure, the character generating unit 232 can be a painting device capable of forming the characters on the food product's surface by painting. For instance, it can be a tool like a cake decorating tip for squeezing a raw material such as cream, syrup or chocolate, etc., onto the food product while enabling the squeezed raw material to be shaped as planed, and after that the food product along with the shaped raw material disposed thereon are send to a drying device for enabling the soft raw material to solidify and thus integrate with the food product. It is noted that such painting device can be a tool capable of shaping the raw material such as chocolate, cream or syrup into characters directly without being moved as the cake decorating tip for forming characters. Accordingly, the character information regarding to the character forms and the character sizes, and so on, can be stored directly in the character generating unit 232, or can be stored in an independent database that is accessible to the character generating unit 232.

Figure 3A:
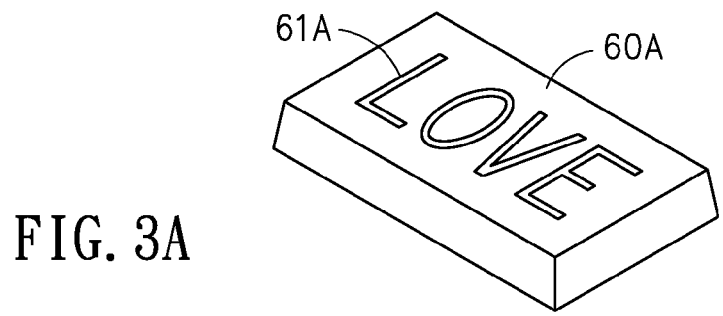
FIG. 3A to FIG. 3D show various types of characters capable of being formed on a chocolate product by the use of a food processor of the present disclosure.
Figure 3B:
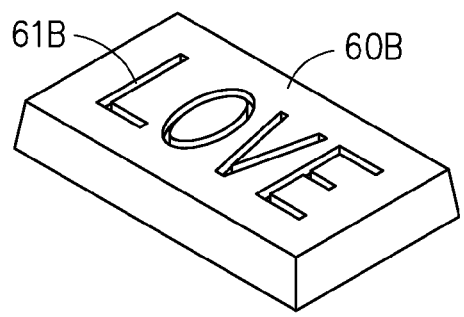
Figure 3C:
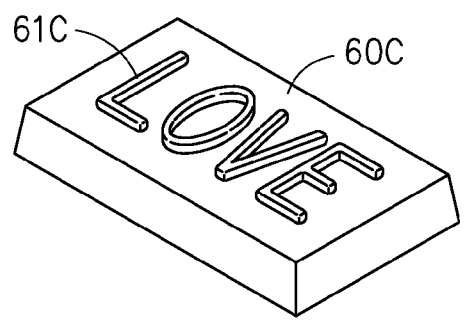
Figure 3D:
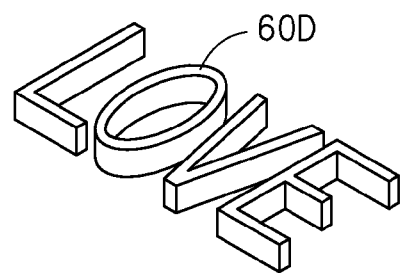

With the aforesaid food processor 20, there can be various types of characters capable of being formed on the food product as the embodiments shown in FIG. 3A to FIG. 3D. In FIG. 3A, the characters 61A is painted on the chocolate 60A. In FIG. 3B, the character 61B is formed on the chocolate 60B by carving. In FIG. 3C, the embossed characters 61C on the chocolate 60C can be formed by carving, embossing or even by first forming the characters 61C independently using a raw material such as candy or chocolate 60C and then attaching the previously formed characters 61C to the chocolate 60C after the character 61C are solidified. In FIG. 3D, the chocolate 60D as the intended food product is shaped directly into the characters by carving or by painting. After the character-shaped food product is solidified, it is then being end out of the food processor 20. It is noted that the individual characters on the so-formed character-shaped food product as that shown in FIG. 3D can be designed to be detachable from each other or to be integrated as a unity.

In the embodiment shown in FIG. 2, when a user is reading out characters "L", "O", "V" and "E" one by one to the food processor 20 in a happy mood, his/her tone should be soft and affective so that as four characters "L", "O", "V" and "E" are recognized by the phonetic recognition module 22, the happy emotion is simultaneously or sequentially detected by the emotion recognition module 21, and thus the emotion recognition module 21 will direct the food supplying unit 231 to provide a sweet chocolate to the character generating unit 232 for having four characters "L", "O", "V" and "E" to be formed therein, or shaping the sweet chocolate into the four characters "L", "O", "V" and "E". However, if the user is reading out the four characters "H", "A", "T" and "E" one by one and detestfully to the food processor 20, his/her tone should be rigid and relentless so that as the four characters "H", "A", "T" and "E" are recognized by the phonetic recognition module 22, the gloomy emotion is simultaneously or sequentially detected by the emotion recognition module 21, and thus the emotion recognition module 21 will direct the food supplying unit 231 to provide a bitter chocolate to the character generating unit 232 for having the four characters "H", "A", "T" and "E" to be formed therein, or shaping the sweet chocolate into the four characters "H", "A", "T" and "E". Thus, different users are able to read out different words or sentences in different emotions so as to obtain food products not only having different characters formed therein, but also with different taste corresponding to their current moods. Similarly, in addition to the ability to form a word or characters on its food products, the food processor 20 of the present disclosure is capable of forming phrases or sentences on the food products and at the same time recognize the emotion implied in the tone of the speech; and also the recognition ability of emotion-related information and emotional signals of the food processor 20 of the present disclosure is not limited to English, it can also recognize other languages, such as Mandarin. For instance, the operation of the food processor 20 can be described as following: at first, a user reads out loud "我討厭你" in Mandarin to the food processor 20, at which the voices of the user is received by the phonetic recognition module 22 and then the four characters "我", "討", "厭" and "你" are recognized thereby as the gloomy emotion is simultaneously detected by the emotion recognition module 21, and thus the emotion recognition module 21 will direct the food supplying unit 231 to provide a bitter chocolate to the character generating unit 232 for having the four characters "我", "討", "厭" and "你" to be formed therein, or shaping the sweet chocolate into the four characters "厭", "討", "厭" and "你". Thereby, different Mandarin-speaking users are able to read out different words or sentences in different emotions so as to obtain food products not only having different characters formed therein, but also with different tastes corresponding to their current moods. It noted that there is no restriction relating to the recognition ordering of the phonetic recognition module 22 and the emotion recognition module 21, i.e. in one embodiment, the phonetic recognition module 22 is first being activated for recognizing characters before the emotion recognition module 21 is activated for recognizing emotions, However, the ordering can be reversed or even performed simultaneously. In addition, for responding to different emotions of the user, the character generating unit 232 is designed to generate punctuation marks and geometrical figures in addition to the aforesaid characters. Similarly, the punctuation marks and geometrical figures can be stored in the character generating unit 232 along with the character information regarding to character forms, character sizes, character colors and character arrangements, or can be stored in an independent database.

In addition to the aforesaid embodiment where the phonetic recognition module 22 is enabled to recognize a word as it is being read out in a character by character manner, the phonetic recognition module 22 of the present disclosure is able to recognize a whole sentence. For instance, when a user is reading out the sentence "I love you" to the food processor 20, the sentence "I love you" is recognized by the phonetic recognition module 22 as there are three English words, i.e. "I", "LOVE" and "YOU", composed of eight English characters, and thus the food supplying unit 231 will be directed thereby to provide a sweet chocolate to the character generating unit 232 for having the eight characters "I", "L", "O", "V", "E", "Y", "O", and "U" to be formed thereon as a sentence by embossing, engraving or painting, or shaping the sweet chocolate into the form of the sentence "I love you", so as to be outputted by the food processor 20 as food products.

Figure 4:
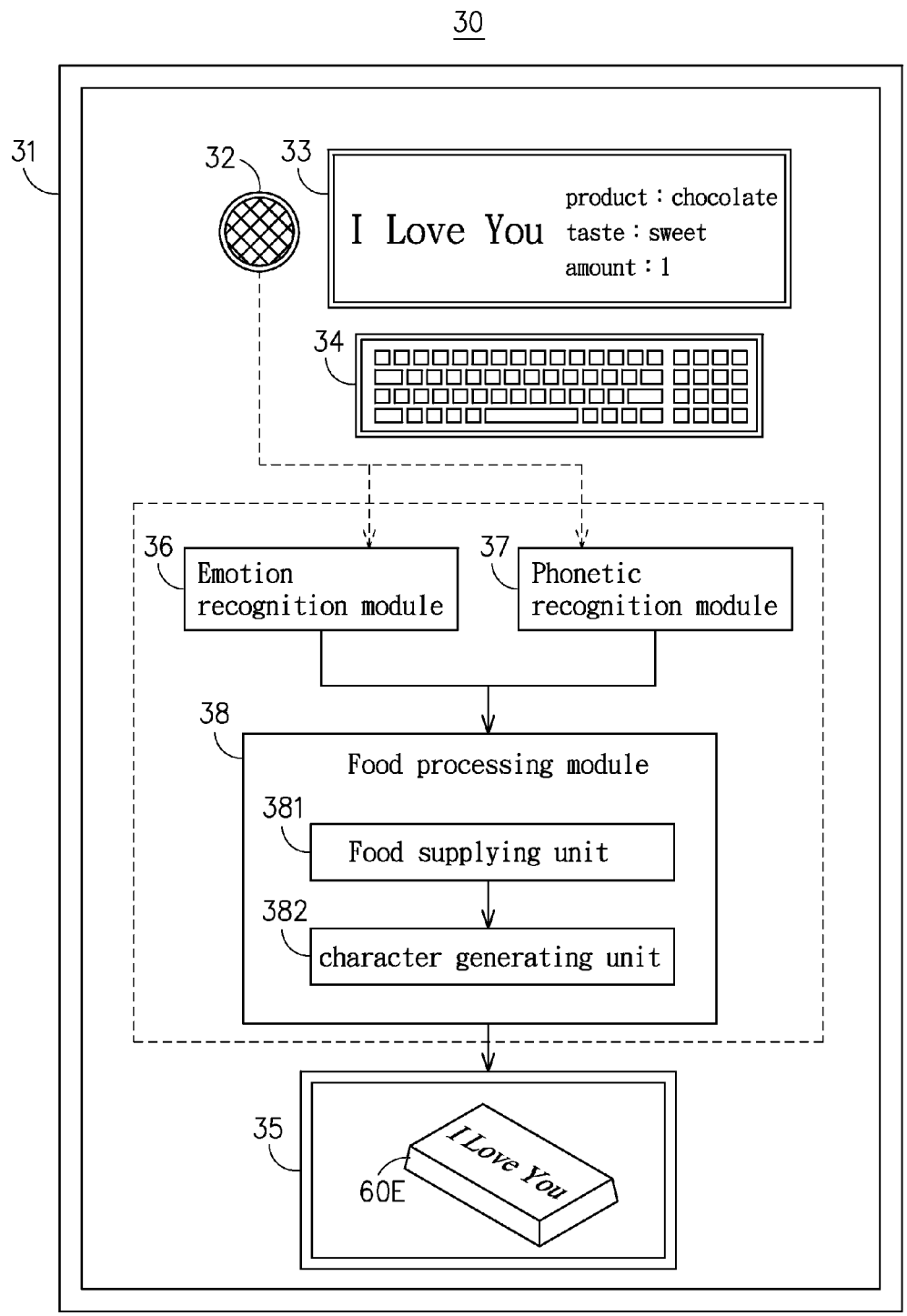
FIG. 4 is a block diagram depicting a food processor according to a third embodiment of the present disclosure.

FIG. 4 is a block diagram depicting a food processor according to a third embodiment of the invention. In FIG. 4, the food processor 30 comprises a platform 31, which is configured with a microphone 32, a displaying unit 33, an input unit 34 and an output 35. It is noted that the displaying unit 33 can be a screen and the input unit 34 can be a keyboard. In another embodiment, the displaying unit 33 can be integrated with the input unit 34 into a touch screen. In addition, there are an emotion recognition module 36, a phonetic recognition module 37 and a food processing module 38 being configured inside the platform 31, in which the food processing module 38 further comprises a food supplying unit 381 and a character generating unit 382. Operationally, when a user reads out loud softly and effectively a sentence "I love you" in front of the platform 31 to the microphone 32, the corresponding sound signal is received by the microphone 32 and then send to the emotion recognition module 36 and the phonetic recognition module 37 for recognition. Thereafter, the recognition result is displayed on the displaying unit 33 in a manner as shown in FIG. 4 where in addition to the sentence "I love you", the information relating to the type of food product, the taste of the food product and the amount of the food product being produced are displayed. It is noted that in addition to the information relating to the character size, character color and character arrangement, etc., the displaying unit 33 is also designed to display a simulated outlook of the food product that is being processed by the food processor.

When the information of the food product displayed on the displaying unit 33 is confirmed by the user through the input unit 34, the food processing module 38 will be activated to produce the food product accordingly and then send the resulting food product to the output 35 where it can be retrieved by the user, which is a chocolate having the sentence "I LOVE YOU" formed thereon, as the chocolate 60E shown in FIG. 4. However, if the information of the food product displayed on the displaying unit 33 is not correct, the user is able to make the corresponding correction through the input unit 34. For instance, if the content of the characters displayed on the displaying unit 33 is not matched with the read-out of the user as the phonetic recognition module 37 is misleading by low voice volume of the user or undistinguishable pronunciation of the user and thus make an erroneous recognition, or the selected taste of the food product to be produced is not matched with the current emotion of the user as the emotion recognition module 36 is not able to make a correct recognition, the erroneous information can be corrected directly by the user through the input unit 34. Moreover, since all the information displayed on the displaying unit 33 can be corrected or even modified by the user through the input unit 34 before being produced, the user is able to specify the information relating to the characters, phrases, and sentences, the character size, the character arrangement, as well as the taste of the food product, the amount of the food product to be produced or even the type of food product to be produced through the input unit 34 for directing the production of the food processing module 38. Thereby, the human-machine interaction of the food processor of the invention is enhanced.

To sum up, the present disclosure provides a food processor with recognition ability of emotion-related information and emotional signals capable of identifying characters and emotions containing in a sound signal issued from a user and thus forming the characters, phrases, or sentences on its food products with corresponding taste accordingly. As the conventional automatic food venders are only capable of providing standardized food products to every users, the food processor of the present disclosure is able to provide custom-made food products of different outlooks and tastes according to user requirements corresponding to their moods so that the users are able to interact with the food processor of the present disclosure, it can greatly encouraging the interest and willingness of consuming.

While several embodiments of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A food processor with recognition ability of emotion-related information and emotional signals, comprises:
    an emotion recognition module, capable of receiving sound signals so as to identify an emotion containing in the received sound signals; and
    a food processing module, capable of producing food products with a taste corresponding to the emotion recognition result of the emotion recognition module.

2. The food processor of claim 1, wherein the taste is a sense selected from the group consisting of: sweet, sour, bitter, spicy, cool and the combination thereof.

3. The food processor of claim 1, further comprising:
    a phonetic recognition module, capable of receiving the sound signals so as to identify a content of characters containing in the received sound signals.

4. The food processor of claim 3, wherein the food processing module is enabled to produce food products containing the characters corresponding to the phonetic recognition result of the phonetic recognition module.

5. The food processor of claim 3, wherein the content of characters recognized by the phonetic recognition module includes: characters, phrases, and sentences, and the total number of the characters.

6. The food processor of claim 3, wherein the food processing module further comprises:
    a food supplying unit, for supplying at least one food product; and
    a character generating unit, for forming at least one character on the food products from the food supplying unit.

7. The food processor of claim 6, wherein the character generating unit is an embossing device capable of impressing on the food product's surface for forming characters lowered into or raised out of the surface of the food product.

8. The food processor of claim 6, wherein the character generating unit is an engraving device capable of forming the characters on the food product's surface by carving.

9. The food processor of claim 6, wherein the character generating unit is a painting device capable of forming the characters on the food product's surface by painting.

10. The food processor of claim 6, wherein the character generating unit is enabled to shape the food product as the characters.

11. The food processor of claim 10, wherein the character generating unit is an engraving device capable of carving the food product as the characters.

12. The food processor of claim 10, wherein the character generating unit is a painting device capable of outlining the characters on the food product by painting.

13. The food processor of claim 1, further comprising:
    a displaying unit, for displaying information relating to the food products being produced by the food processing module whereas the information includes the type of food product, the taste of food product and the amount of food product.

14. The food processor of claim 13, further comprising:
    an input unit, provided for a user to input information relating to the type of food product, the taste of food product and the amount of food product.

15. The food processor of claim 14, wherein the input unit is integrally formed with the displaying unit into a touch screen.

16. The food processor of claim 14, wherein the input unit is electrically connected to the food processing module for enabling the same to produce food products corresponding to the information inputted by the user with respect to the taste, the type and the amount.

17. The food processor of claim 13, wherein the displaying unit is enabled to display the content of characters recognized by the phonetic recognition module.

18. The food processor of claim 17, wherein the content being displayed by the displaying unit includes information selected from the group consisting of: character form, character size, character color, character arrangement and others.

19. The food processor of claim 17, further comprising:
    an input unit, provided for a user to input characters.

20. The food processor of claim 19, wherein the input unit is integrally formed with the displaying unit into a touch screen.

21. The food processor of claim 19, wherein the input unit is electrically connected to the food processing module for enabling the same to produce food products containing characters corresponding to the information inputted by the user.

22. The food processor of claim 1, further comprising:
    an input unit, provided for a user to input information relating to the taste of food product.

23. The food processor of claim 22, further comprising:
    an input unit, provided for a user to input information relating to the type of food product and the amount of food product.

24. The food processor of claim 22, wherein the input unit is electrically connected to the food processing module for enabling the same to produce food products containing characters corresponding to the information inputted by the user.

25. The food processor of claim 3, further comprising:
    a database, having at least a character form, at least a character size and at least a character color stored therein.

26. The food processor of claim 1, wherein the food products being produced by the food processing module includes chocolates, candies, drinks, cakes or cookies.

* * * * *